United States Patent
Park

(10) Patent No.: US 9,287,750 B2
(45) Date of Patent: Mar. 15, 2016

(54) MOTOR

(71) Applicant: LG INNOTEK CO., LTD., Seoul (KR)

(72) Inventor: Jae Hyun Park, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 262 days.

(21) Appl. No.: 13/954,371

(22) Filed: Jul. 30, 2013

(65) Prior Publication Data

US 2014/0028133 A1 Jan. 30, 2014

(30) Foreign Application Priority Data

Jul. 30, 2012 (KR) ........................ 10-2012-0083031

(51) Int. Cl.
*H02K 7/108* (2006.01)
(52) U.S. Cl.
CPC ..................................... *H02K 7/108* (2013.01)
(58) Field of Classification Search
CPC ..................................................... H02K 7/108
USPC ............................................... 310/78, 90, 92
See application file for complete search history.

(56) References Cited

U.S. PATENT DOCUMENTS

| | | | | |
|---|---|---|---|---|
| 1,678,945 A * | 7/1928 | Jones | .............. | 477/12 |
| 3,582,697 A * | 6/1971 | Bochan et al. | .............. | 310/78 |
| 3,662,197 A * | 5/1972 | Worst | .............. | 310/78 |
| 4,334,161 A * | 6/1982 | Carli | .............. | 310/68 E |
| 5,503,343 A * | 4/1996 | Hirano et al. | .............. | 242/247 |
| 5,638,931 A * | 6/1997 | Kerr | .............. | 192/45.005 |
| 5,675,202 A * | 10/1997 | Zenmei et al. | .............. | 310/100 |
| 5,691,587 A * | 11/1997 | Lamb | .............. | 310/103 |
| 6,129,455 A * | 10/2000 | Galante | .............. | 384/537 |
| 6,333,577 B1 * | 12/2001 | Kusumoto et al. | .............. | 310/102 R |
| 6,420,809 B1 * | 7/2002 | Obara | .............. | 310/90 |
| 2010/0184543 A1 * | 7/2010 | Yamashita et al. | .............. | 474/11 |
| 2011/0227436 A1 * | 9/2011 | Ishida et al. | .............. | 310/78 |
| 2012/0091842 A1 * | 4/2012 | Kim et al. | .............. | 310/90 |

* cited by examiner

*Primary Examiner* — Alex W Mok
(74) *Attorney, Agent, or Firm* — Saliwanchik, Lloyd & Eisenschenk

(57) ABSTRACT

A motor is provided, the motor including a motor housing, a stator fixedly coupled to the motor housing, a rotor rotatably installed at a center of the stator by a rotation shaft, upper and bottom bearings having an outer race fixed to the motor housing and an inner race coupled to the rotation shaft, and an output clutch contacting an inner race of the upper bearing.

10 Claims, 5 Drawing Sheets

MOTOR

CROSS-REFERENCE TO RELATED APPLICATION

This application claims the benefit under 35 U.S.C. §119 of Korean Patent Application No. 10-2012-0083031, filed Jul. 30, 2012, which is hereby incorporated by reference in its entirety.

BACKGROUND

1. Field of the Invention

Exemplary embodiments of the present disclosure relate to a motor for a vehicle.

2. Description of Related Art

Generally, almost every vehicle employs an electric power-assist steering system. Such an electric power-assist steering system generates an assist force based on the steering torque and the steering angle in order to enhance the steering performance of the vehicle.

That is, a steering system that assists a steering force of a vehicle with a separate power is used to enhance the motion stability of a vehicle.

Conventionally, the auxiliary steering device uses hydraulic pressure, but an Electronic Power Steering (EPS) system adapted to transmit a rotation output of an electric motor to a steering shaft via a speed reduction mechanism has been increasingly employed these days from a view point of a reduction in engine load, a reduction in weight, an enhanced steering stability and a quick restoring force.

The EPS system is configured such that an Electronic Control Unit (ECU) drives a motor in response to steering conditions detected by a speed sensor, a torque angle sensor and a torque sensor to enhance a steering stability and provide a quick restoring force, whereby a driver can safely steer a vehicle.

The EPS system is also configured such that a motor assists a torque manipulating a steering wheel to allow a driver to steer a vehicle with less power, where the motor employs a Brushless Direct Current (BLDC) motor.

The BLDC motor generally forms an exterior look by coupling of a housing with a cover member, an inner circumferential surface of the housing is provided with a stator, and the stator is centrally formed with a rotor rotatably mounted in electrical interaction with the stator. The rotor is rotatably supported by a rotation shaft, and the rotation shaft may be rotatably fixed at the housing by upper/lower bearings. Furthermore, an upper surface of the rotation shaft is coupled by an output clutch to transmit a power to a steering shaft.

However, the output clutch may repetitively receive a force applying a pressure to an inner direction of the motor, if a driver repetitively turns a steering wheel. In a case the pressing force is continuously generated, a coupling between the rotation shaft and the upper bearing may be disintegrated, which is caused by the fact that a coupling force between the rotation shaft and the output clutch is greater than a coupling force between the rotation shaft and the upper bearing. Thus, the rotation shaft of the motor may not disadvantageously make an accurate rotation if the coupling between the upper bearing and the rotation shaft becomes disintegrated or loosened.

BRIEF SUMMARY

Exemplary aspects of the present disclosure are to substantially solve at least the above problems and/or disadvantages and to provide at least the advantages as mentioned below. Thus, the present disclosure is directed to provide a motor configured to improve a structure by inhibiting a coupling between a rotation shaft and an upper bearing from being disintegrated by a pressure applied to an output clutch.

In one general aspect of the present disclosure, there is provided a motor, the motor comprising:

a motor housing;

a stator fixedly coupled to the motor housing;

a rotor rotatably installed at a center of the stator by a rotation shaft;

upper and bottom bearings having an outer race fixed to the motor housing and an inner race coupled to the rotation shaft; and an output clutch contacting an inner race of the upper bearing.

Preferably, but not necessarily, the output clutch may include a sintering member surface-contacting the inner race and press-fitted into the rotation shaft, and a clutch member formed by being arranged at a center of the sintering member.

Preferably, but not necessarily, the sintering member may include a distal end having a diameter corresponding to the inner race of the upper bearing.

Preferably, but not necessarily, the distal end of the sintering member may surface-contact the inner race of the upper bearing.

Preferably, but not necessarily, the distal end of the sintering member may point-contact the inner race of the upper bearing on at least one point.

Preferably, but not necessarily, the distal end of the sintering member may include at least one pair of lugs.

Preferably, but not necessarily, the lugs may be symmetrically arranged about the output clutch.

Preferably, but not necessarily, each height of the lugs may be same.

Preferably, but not necessarily, the clutch member may be insert-injection molded by allowing the sintering member to be arranged at a core.

Preferably, but not necessarily, the rotation shaft may include a hitching sill surface-contacting a surface opposite to the inner race of the upper bearing.

Preferably, but not necessarily, a distance between the hitching sill and the sintering member may correspond to a thickness of the inner race of the upper bearing.

There is an advantageous effect in the motor according to an exemplary embodiment of the present disclosure in that a sintering member forming an inner race of an output clutch is brought into contact with an inner race of a bearing supporting a rotation shaft to inhibit the sintering member from moving along with the rotation shaft even if the output clutch receives an external pressure, and to inhibit the rotation shaft from axially moving from an inner race of an upper bearing, whereby erroneous operations such as noise and vibration caused by disengagement of bearing of the rotation shaft can be inhibited.

Another advantageous effect is that frictional force can be increased by allowing an output clutch and an inner race of an upper bearing supporting a distal end of a rotation shaft to maintain a contact state to minimize generation of slip at a coupled position due to slippage of the output clutch and the rotation shaft during rotational operation.

DETAILED DESCRIPTION

Now, a motor according to exemplary embodiments of the present disclosure will be described in detail with reference to the accompanying drawings.

Figure 1:
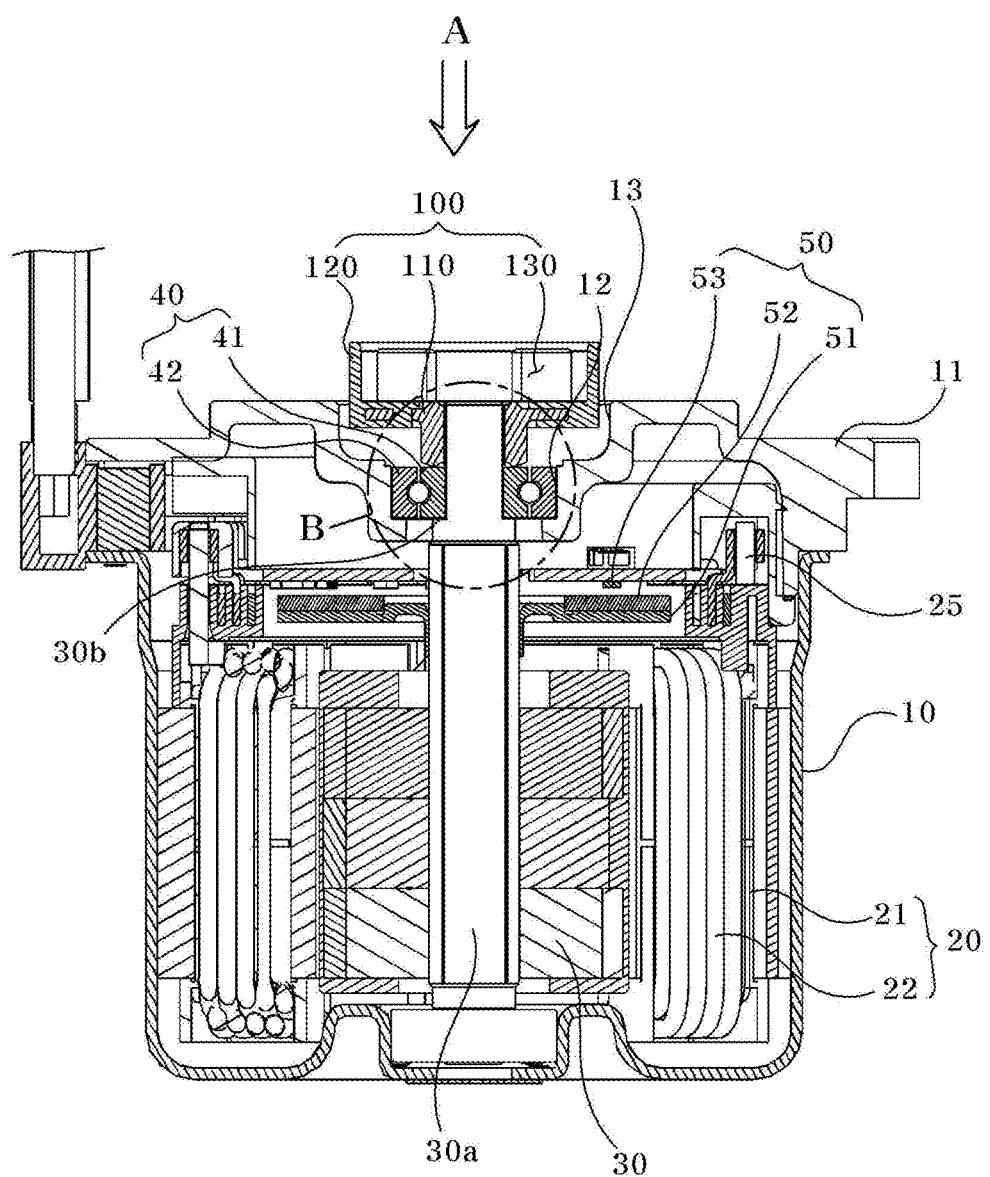
FIG. 1 is a cross-sectional view illustrating a motor according to an exemplary embodiment of the present disclosure.
Figure 2:
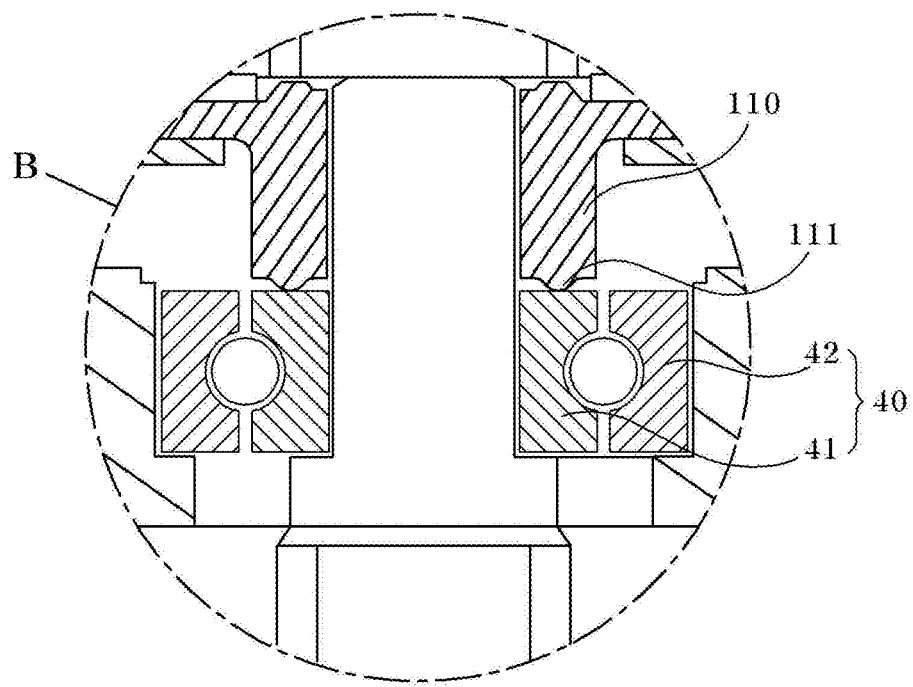
FIG. 2 is an enlarged view of 'B' part of FIG. 1 according to a first exemplary embodiment of the present disclosure.
Figure 3:
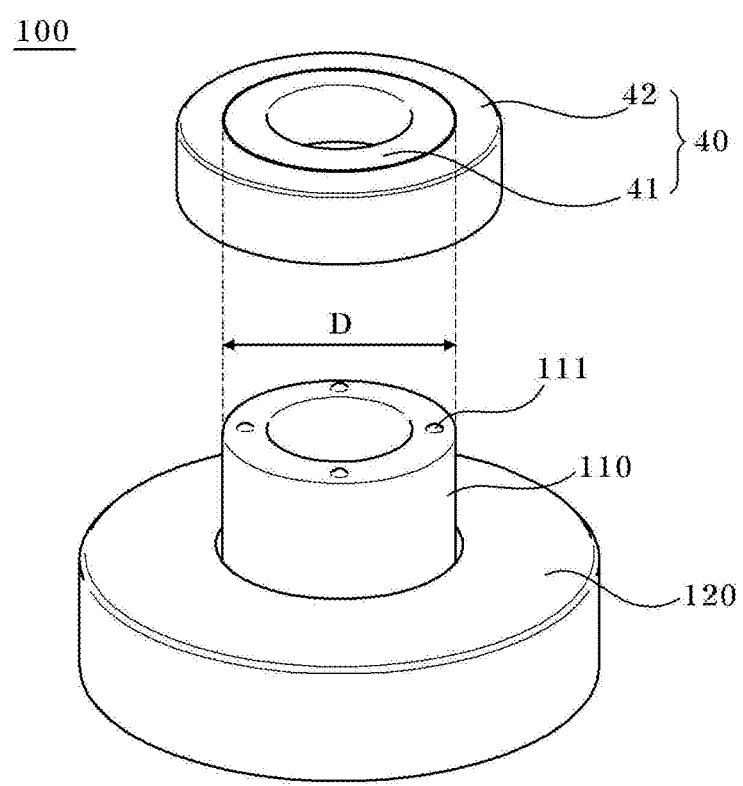
FIG. 3 is an exploded perspective view illustrating an output clutch and an upper bearing according to a first exemplary embodiment of the present disclosure.
Figure 4:
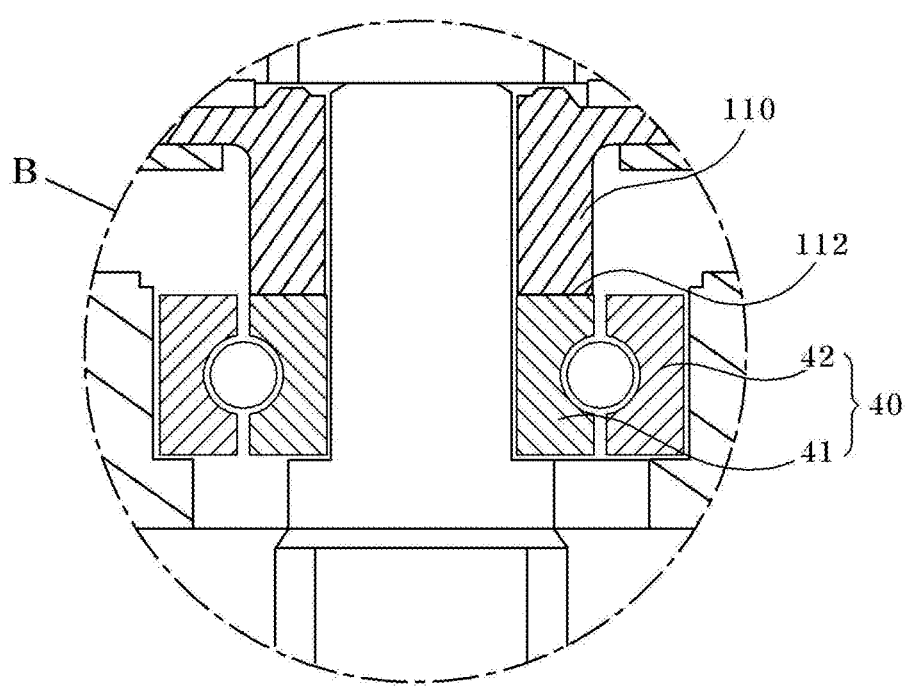
FIG. 4 is an enlarged view of 'B' part of FIG. 1 according to a second exemplary embodiment of the present disclosure.
Figure 5:
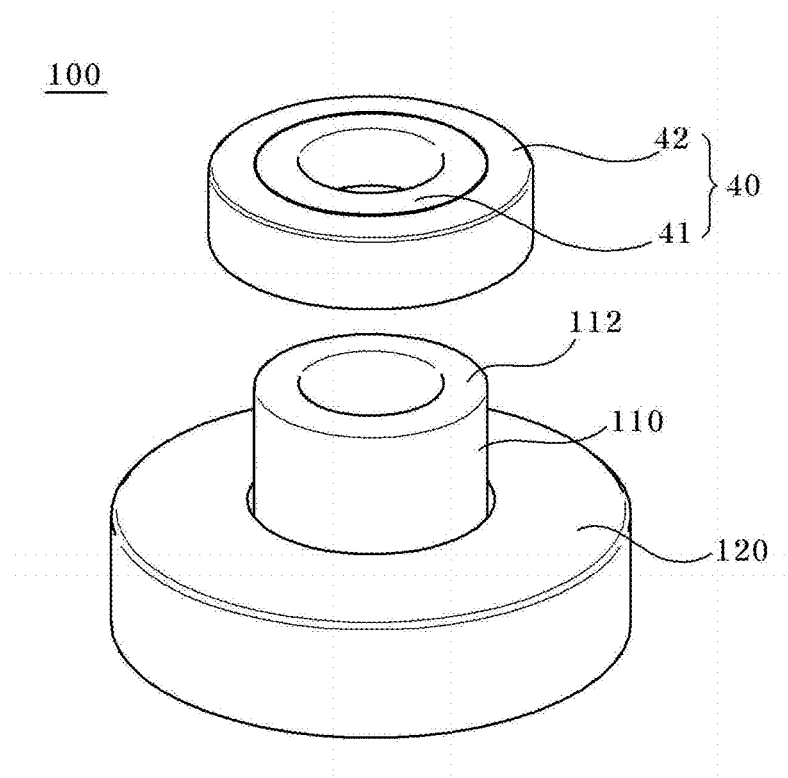
FIG. 5 is an exploded perspective view illustrating an output clutch and an upper bearing according to a second exemplary embodiment of the present disclosure.

FIG. 1 is a cross-sectional view illustrating a motor according to an exemplary embodiment of the present disclosure, FIG. 2 is an enlarged view of 'B' part of FIG. 1 according to a first exemplary embodiment of the present disclosure, FIG. 3 is an exploded perspective view illustrating an output clutch and an upper bearing according to a first exemplary embodiment of the present disclosure, FIG. 4 is an enlarged view of 'B' part of FIG. 1 according to a second exemplary embodiment of the present disclosure, and FIG. 5 is an exploded perspective view illustrating an output clutch and an upper bearing according to a second exemplary embodiment of the present disclosure.

Referring to FIG. 1, a motor according to an exemplary embodiment of the present disclosure may include a motor housing (10), a stator (20), a rotor (30), an upper bearing (40) and an output clutch (100).

The motor housing (10) takes an approximately cylindrical shape with an upper side opened and a bottom side closed. The motor housing (10) is installed therein with the stator (20), the rotor (30) and a rotation shaft (30a) rotatably supporting the rotor (30). The rotor housing (10) may be installed at an upper surface with a cover member (11) as illustrated in FIG. 1, where the cover member (11) may be provided with a bearing reception unit (12) accommodating the upper bearing (40) and a clutch reception unit (13) arranged with the output clutch (100).

The bearing reception unit (12) may be provided with an approximately circular groove shape, and may be provided with a cylindrical groove having a diameter corresponding to that of an outer race of the upper bearing (40), in view of the fact that the upper bearing is generally provided with a cylindrical shape. Furthermore, the bearing reception unit (12) may have a height corresponding to a thickness of the upper bearing (4).

The clutch reception unit (13) may be formed at an approximate center of the cover member (11), and may be provided with a cylindrical shape having a diameter greater than that of the bearing reception unit (12). The clutch reception unit (13) may be formed with a diameter greater than that of the output clutch (100) to avoid interference with the output clutch (100).

The stator (20) includes a stator core (21), a coil (22) and a coil terminal (25) formed by stripping a distal end of the coil (22). The stator core (21) may be provided with a plurality of teeth, and the coil (22) may be wound on the periphery of the teeth via an insulator. A distal end of the coil (22) may be stripped to form the coil terminal (25), where the coil terminal (25) may be provided with a cylinder shape having a predetermined diameter and length.

The rotor (30) is rotatably installed at a center of the stator (20), and a plurality of magnets is installed at a periphery of a rotor core. The rotation shaft (30a) is coaxially installed with the rotor (30), one end of which is rotatably supported by a bottom bearing installed on a floor surface of the motor housing (10), and the other end of which is supported by the upper bearing (40) installed at the cover member (11). In general, the bottom bearing is installed via an elastic member such as a spring washer, and therefore, the rotation shaft (30a) can move to an axial direction in response to elastic deformation of the elastic member to cope with an external shock.

The upper bearing (40), as illustrated, may include an inner race (41) and an outer race (42), where the inner race (41) can rotate in association with rotation of the rotation shaft (30a).

A sensing unit (50) includes a plate (51), a sensing magnet (52) and a magnetic element (53). The plate (51) is provided with an approximately disc-like shape, and the sensing magnet (52) is fixed to an upper surface by an adhesive. The sensing magnet (52) may be centrally formed with a through hole. The magnetic element (53) serves to detect changes in magnetic field of the sensing magnet (52), and is installed opposite to the sensing magnet (52).

The output clutch (100) is coupled to a distal end of the rotation shaft (30a) protruded by passing through the upper bearing (40), and may include a sintering member (110) coupled to the distal end of the rotation shaft (30a), and a clutch member (120) having a predetermined shape about the sintering member (110).

The sintering member (110) is centrally installed with a rotation shaft press-fit hole having a diameter corresponding to the distal end of the rotation shaft (30a), whereby the rotation shaft (30a) can be press-fitted into the rotation shaft press-fit hole. The rotation shaft press-fit hole and the rotation shaft (30a) may be installed for surface-contact therebetween, and an inner surface of the rotation shaft press-fit hole and a periphery of the rotation shaft (30a) can be inhibited from sliding during rotation operation by a surface process such as knurling, if necessary. Generally, a coupling force between the rotation shaft press-fit hole and the rotation shaft (30a) may be relatively greater than a coupling force between the upper bearing (40) and the rotation shaft (30a).

Meanwhile, the sintering member may take various shapes, and according to an exemplary embodiment of the present disclosure, a disc having a predetermined thickness is formed at a distal end of a side at the cylindrical body formed with the rotation shaft press-fit hole, and the disc may be penetratively formed with a plurality of through holes. The through holes serve to tightly maintain a coupling between the clutch member (120) and the sintering member (110), operation of which will be described later.

The clutch member (120) may be injection molded with resin material, and according to an exemplary embodiment of the present disclosure, the clutch member (120) may be insert injection molded using the sintering member (110) as a core. Meanwhile, a through hole formed at the sintering member (110) may be filled with the resin forming the sintering member (110) when the clutch member (120) is injection molded, whereby the clutch member (120) can be inhibited from being separated from the sintering member (110), or from idling about the sintering member (110). At least one through hole may be formed at the sintering member (110) and two or more through holes may be provided, if necessary. If two or more through holes are provided, the through holes may be symmetrically formed about the clutch member (120), and each through hole may be spaced apart from the other through hole at a predetermined distance.

The clutch member (120) may be centrally formed with a concave groove (130) having a predetermined shape. The concave groove (130) may be variably shaped in response to a shape of an object connected to the clutch member (120). For example, the concave groove (130) may take a polygonal shape such as a rectangle or a triangle, or a convex groove structure such as a cross (+) or a straight (−) may be formed to transmit an electric power. The convex groove (130) may be provided with other various shapes. At this time, the concave groove (130) may take any shape as long as a rotational operation of the rotation shaft (30*a*) can be transmitted to the object in a complimentary shape to that of the object. That is, the rotational operational of the rotation shaft (30*a*) can be transmitted to the object by the concave groove (130). Albeit not being illustrated, the power may be transmitted by a belt wrapped on a periphery of the clutch member (120), instead of the concave groove (130).

As mentioned above, although the exemplary embodiment of the present disclosure has explained and described that the sintering member (110) and the clutch member (120) are formed with mutually different materials, and the insert injection molding is performed by arranging the sintering member (110) to the core of the clutch member (120), the present disclosure is not limited thereto, and the sintering member (110) and the clutch member (120) may be formed with a same material. That is, the sintering member (110) and the clutch member (120) may be injection molded at one time with a same material.

However, the material that is used for injection molding is generally resin material, and if the resin material is used for a long time, the physical properties of the resin material may be changed, such that it is difficult to fix the clutch member (120) at a predetermined position of the rotation shaft (30*a*), because the resin material is susceptible to heat and pressure. Hence, a portion press-fitted and coupled with the rotation shaft (30*a*) is formed with the sintering member (110) using a metal or other materials having a similar physical properties through a method such as a sintering or a cutting method, and only the portion of the clutch member (120) connected to the object may be formed with an injection product.

Meanwhile, the present disclosure may be characterized by the fact that a distal end of the sintering member (110) is always brought into contact with an inner race (41) of the upper bearing (40). At this time, the present disclosure may be divided into two exemplary embodiments, i.e., a first exemplary embodiment and a second exemplary embodiment according to a contact configuration between the sintering member (110) and the inner race (41) of the upper bearing (40).

According to the first exemplary embodiment of the present disclosure, as illustrated in FIGS. 2 and 3, the distal end of the sintering member (110) may be formed with a plurality of lugs (111), where the lugs (111) can maintain a contact with the inner race (41) of the upper bearing (40).

The lugs (111) may be provided in a plural number, and as illustrated in FIG. 3, the lugs (111) may be symmetrically arranged about a central axis, or a plurality of lugs (111) may be protrusively formed each at a predetermined distance. As illustrated in FIG. 3, each of the lugs (111) may be arranged with a dome shape, and albeit not being illustrated, each of the lugs (111) may take various shapes including a pillar, a prism and a triangular pyramid. However, there is a need of each distal end of all the lugs (111) being brought into contact with the inner race (41) of the upper bearing (40) by allowing each height of the lugs (111) to be equally formed.

The motor according to the present disclosure transmits a power to an object through the concave groove (130) formed at the clutch member (120), and in a case the motor is applied to a motor-operated steering system (or a motor-driven power steering system), the object may be a steering system. The steering system rotates an input shaft in association with a rotational operation of a steering wheel that changes a direction of a vehicle, The rotation of the input shaft allows a rotational angle and a torque of the input shaft to be detected by a torque sensor and an angle sensor, and the motor is controlled by determining, by a predetermined control unit (controller), how much a driver rotates the input shaft using a detected value. That is, the controller rotates a steering shaft in correspondence with a revolution of the input shaft rotated by the driver, whereby the motor thus configured can be controlled to this end. Thus, the controller determines the revolution of the rotation shaft (30*a*) based on a value thus measured, where the rotational force of the rotation shaft (30*a*) can be transmitted to the steering shaft through the output clutch (100).

The motor-operated steering system may be divided into four methods based on an installation position of an applicable motor, i.e., a column type, a pinion type, a rack type and an electric hydraulic power steering type. The column type may be applied to compact vehicles, the pinion type to compact vehicles or small vehicles, the rack type to mid-sized and heavy duty vehicles and the electric hydraulic power steering type may be applied to mid-sized and small vehicles. The motor-driven steering system of rack type is also called an MDPS (Motor Driven Power Steering). The rack type is a method in which an existing gearbox rack unit is magnetized to rotate a rack box and is largely used for heavy vehicles. The electric hydraulic power steering type uses oil as in the conventional method to allow a motor to perform a pumping operation.

Meantime, if a driver steers a steering wheel, a steering shaft that is an object connected to the output clutch (100) generates a load due to a frictional force generated by wheels (not shown) contacting a ground, a repulsive force is generated by the load and a force pressing the clutch member (100) to an arrow 'A' direction of FIG. 1 may be further increased.

However, even if the load is generated to the arrow 'A' direction of FIG. 1 in response to the steering operation by the driver thus described, the distal end of the sintering member (110) is protrusively formed with a plurality of lugs (111) as illustrated in FIGS. 2 and 3 to point-contact the inner race of the upper bearing (40) according to the first exemplary embodiment of the present disclosure.

As a result, even if the force of arrow 'A' direction in FIG. 1 is continuously acted to cause the sintering member (110) to move toward the upper bearing (40), a distance between the lugs (111) and the inner race (41) is not changed because the contact condition between the lugs (111) and the inner race (41) is maintained, whereby a position of the output clutch (100) and the a position of the rotation shaft (30*a*) coupled to the inner race (41) of the upper bearing (40) can maintain initial statuses.

That is, a distal end of the inner race (41) of the upper bearing (40) can be supported by a hitching sill (30*b*) formed at a coupling unit of the rotation shaft (30*a*). In this case, one surface of the inner race (41) maintains a contact status with the hitching sill (30*b*) and a bearing reception unit (12) of the cover member (11), while the other opposite surface is brought into contact with the lugs (111) protrusively formed at the distal end of the sintering member (110), such that even if an external force is applied to the 'A' direction of FIG. 1 through the sintering member (110), the upper bearing (40) cannot be moved any longer by the hitching sill (30*b*) and the bearing reception unit (12).

Thus, unless the rotation shaft (30*a*) is directly moved, the coupling between the inner race (41) of the upper bearing (40) and the rotation shaft (30*a*) cannot be disintegrated.

According to the present disclosure, even if an external force is applied to the output clutch (100), the output clutch (100) is not moved to a direction to which the external force is applied due to the external force, the rotation shaft (30a) never move to the arrow 'A' direction of FIG. 1. Particularly, because the coupling force between the sintering member (110) and the rotation shaft (30a) is greater than the coupling force between the inner race (41) and the rotation shaft (30a), the clutch member (120) and the sintering member (110) may be broken by the external force transmitted through the clutch member (120), but the rotation shaft (30a) coupled to the sintering member (110) is not moved.

Meanwhile, a diameter of the distal end of the sintering member (110) and a diameter (D) of the inner race (41) may be differently formed. This is because the lugs (111) may be brought into contact, not with the inner race (41), but with an outer race (42), if the diameter of the sintering member (110) is excessively greater than that of the inner race (41). That is, the lugs (111) must be always brought into contact with the inner race (111), and should not be interfered with the outer race (42), because the inner race (41) and the output clutch (100) must rotate in association with the rotation of the rotation shaft (30a).

Now, referring to FIGS. 4 and 5, according to a second exemplary embodiment of the present disclosure, a distal end surface (112) of the sintering member (110) and the inner race (41) may be surface-contacted at a mutually opposite entire surface thereof. In this case, there is a need of a diameter of the distal end surface (112) of the sintering member (110) being correspondingly formed to the diameter (D) of the inner race (41), or being formed smaller than the diameter (D) of the inner race (41).

In a case the sintering member (110) is brought into contact with the inner race (41) through the distal end surface (112) as explained above, the rotation shaft (30a) and the sintering member (110) are inhibited from slipping by the surface-contact between the distal end surface (112) and the inner race (41). That is, if a centrifugal force greater than a frictional force at the mutually surface-contacted area is generated by press-fitted coupling of the rotation shaft (30a) and the sintering member (110), there may be a case where the rotation shaft (30a) slips from the sintering member (110).

However, in a case the distal end surface (112) is brought into surface-contact with the inner race (41) of the upper bearing (40), a frictional force can be additionally generated by the surface-contact between the distal end surface (112) and the inner race (41) to inhibit a slip between the rotation shaft (30a) and the sintering member (110). As a result, even if the motor is used for a long time, a stable rotational operation between the rotation shaft (30a) and the sintering member (110) can be gained.

As apparent from the foregoing, the exemplary embodiments of the present disclosure have advantageous effect in that, even if the output clutch (100) is applied with a pressure to an arrow 'A' direction by a repetitive steering operation by a driver, the rotation shaft (30a) is inhibited from moving to an axial direction by surface-contact between the sintering member (110) and the inner race (41) of the upper bearing (40), and as a result, motor rotation and output reliability can be secured because the coupling between the upper bearing (40) and the rotation shaft (30a) is maintained at a predetermined position.

Although exemplary embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims.

What is claimed is:

1. A motor, the motor comprising:
   a motor housing;
   a stator fixedly coupled to the motor housing;
   a rotor rotatably installed at a center of the stator by a rotation shaft;
   upper and bottom bearings having an outer race fixed to the motor housing and an inner race coupled to the rotation shaft; and
   an output clutch contacting an inner race of the upper bearing:
   wherein the output clutch includes a sintering member surface-contacting the inner race and press-fitted into the rotation shaft, and a clutch member formed by being arranged at a center of the sintering member.

2. The motor of claim 1, wherein the sintering member includes a distal end having a diameter corresponding to the inner race of the upper bearing.

3. The motor of claim 2, wherein the distal end of the sintering member surface-contacts the inner race of the upper bearing.

4. The motor of claim 2, wherein the distal end of the sintering member point-contacts the inner race of the upper bearing on at least one point.

5. The motor of claim 4, wherein the distal end of the sintering member includes at least one pair of lugs.

6. The motor of claim 5, wherein the lugs are symmetrically arranged about the output clutch.

7. The motor of claim 5, wherein each height of the lugs is the same.

8. The motor of claim 1, wherein the clutch member is insert-injection molded by allowing the sintering member to be arranged at a core.

9. The motor of claim 1, wherein the rotation shaft includes a hitching sill surface-contacting a surface opposite to the inner race of the upper bearing.

10. The motor of claim 9, wherein a distance between the hitching sill and the sintering member corresponds to a thickness of the inner race of the upper bearing.

* * * * *